United States Patent
Fleischer et al.

(10) Patent No.: US 12,503,195 B2
(45) Date of Patent: Dec. 23, 2025

(54) FASTENING ARRANGEMENT, IN PARTICULAR FOR FASTENING AN ELECTRIC DRIVE TO AN ELECTRIC BICYCLE

(71) Applicant: Robert Bosch GmbH, Stuttgart (DE)

(72) Inventors: Claus Fleischer, Stuttgart-Vaihingen (DE); Conrad Haeussermann, Trochtelfingen (DE); Erdogan Dikmenli, Ludwigsburg (DE); Harald Hundt, Aichelberg (DE); Jannis-Jeremias Schipperges, Reutlingen (DE); Mehmet Yalcin, Moeglingen (DE); Peter Niebel, Kusterdingen-Maehringen (DE); Rolando Doelling, Hechingen (DE); Sigmund Braun, Hechingen (DE); Stefan Holst, Kusterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 246 days.

(21) Appl. No.: 18/000,780

(22) PCT Filed: Aug. 19, 2021

(86) PCT No.: PCT/EP2021/073046
§ 371 (c)(1),
(2) Date: Dec. 5, 2022

(87) PCT Pub. No.: WO2022/043182
PCT Pub. Date: Mar. 3, 2022

(65) Prior Publication Data
US 2023/0219651 A1    Jul. 13, 2023

(30) Foreign Application Priority Data

Aug. 28, 2020  (DE) ..................... 10 2020 210 864.1

(51) Int. Cl.
*B62K 19/34*    (2006.01)
*B62M 6/55*    (2010.01)

(52) U.S. Cl.
CPC ............... *B62M 6/55* (2013.01); *B62K 19/34* (2013.01)

(58) Field of Classification Search
CPC ........... B62M 6/55; B62M 6/40; B62K 19/34; B62K 19/30; F16B 5/0241
(Continued)

(56) References Cited

U.S. PATENT DOCUMENTS 9,904,073 B2    2/2018  Da Col
10,300,985 B2 *  5/2019  Mano .................... F16B 5/0233
(Continued)

FOREIGN PATENT DOCUMENTS

CN    117163206 A  * 12/2023 ............. B62M 6/55
DE       4102455 A1    7/1992
(Continued)

OTHER PUBLICATIONS

International Search Report for PCT/EP2021/073046, Issued Dec. 2, 2021.

*Primary Examiner* — Karen Beck
(74) *Attorney, Agent, or Firm* — NORTON ROSE FULBRIGHT US LLP

(57) ABSTRACT

A fastening system configured for fastening a device to a hollow component having two holes situated opposite one another. The fastening system includes a first screw that has a head and that is designed to be guided through a first hole of the holes, and a sliding sleeve having an outer diameter that has a tolerance. The sliding sleeve is designed to accept the first screw at the second hole of the holes. An outer diameter of the sliding sleeve is displaceable in the axial direction of the first screw due to a clearance fit.

17 Claims, 6 Drawing Sheets

(58) Field of Classification Search
USPC .................................................. 280/281.1
See application file for complete search history.

(56) References Cited

U.S. PATENT DOCUMENTS

| | | | | |
|---|---|---|---|---|
| 2004/0032067 A1* | 2/2004 | Sebert | .................... | F16F 15/06 |
| | | | | 267/147 |
| 2006/0226630 A1* | 10/2006 | Tolhurst | ................. | B62K 13/00 |
| | | | | 280/261 |
| 2017/0314593 A1* | 11/2017 | Mano | .................... | B62K 11/04 |

FOREIGN PATENT DOCUMENTS

| | | | | |
|---|---|---|---|---|
| DE | 19547310 A1 * | 6/1997 | ............ | F16C 34/077 |
| DE | 102005022202 A1 * | 7/2006 | ............ | F16B 5/0233 |
| DE | 102016112778 A1 * | 1/2017 | ............ | B62K 19/34 |
| DE | 102016115681 A1 | 3/2017 | | |
| DE | 102017201617 A1 | 8/2018 | | |
| DE | 102017214190 A1 | 2/2019 | | |
| DE | 102023114110 A1 * | 12/2024 | ............ | B62M 6/55 |
| JP | S62030005 U | 2/1987 | | |
| JP | H10259811 A | 9/1998 | | |
| JP | 2001071982 A | 3/2001 | | |

* cited by examiner

FASTENING ARRANGEMENT, IN PARTICULAR FOR FASTENING AN ELECTRIC DRIVE TO AN ELECTRIC BICYCLE

FIELD

The present invention relates to a fastening system that is designed to enable a fastening of a device to a hollow component, such as a hollow frame of a bicycle, having two holes situated opposite one another. In particular, the present invention relates to a fastening system for fastening an electric drive to a bicycle frame, as well as to an electric bicycle having such a fastening system for fixing the electric drive to a hollow frame component of the electric bicycle.

BACKGROUND INFORMATION

When fastening components using fastening systems, several aspects that may be contradictory often have to be taken into account. In particular when mounting an electric drive on a bicycle frame, there are specific requirements. On the one hand, mechanical stability has to be provided by the fastening system over its entire lifespan. In addition, tolerance compensation has to be enabled between the mechanical interfaces of the electric drive and the hollow frame, or an open mount or the like. To fasten electric drives to a bicycle frame, single-piece screws are usually used that are guided through two holes situated opposite one another. Here tolerance compensation takes place through an elastic deformation in the area of the interface between the screw and the frame. However, this introduces mechanical tensions into the system. Another problem area is that the frame, as a hollow component, forms a resonant body, so that noises produced by the electric drive during operation are amplified by the hollow frame or cause vibrations in the electric bicycle. Therefore, it would be desirable to realize an improved fastening of a device to a hollow component, in particular of an electric drive to a bicycle frame or the like.

SUMMARY

A fastening system according to the present invention has an advantage that on the one hand a high degree of mechanical stability is achieved over the lifespan of the components to be fastened, and tolerance compensation is also possible at a mechanical interface between the device to be fastened and the hollow component. In addition, the fastening system according to the present invention has only a small space requirement, and in addition also enables noise reduction when the device to be fastened produces noises during operation that could be amplified by the hollow component as resonant body. According to an example embodiment of the present invention, this is achieved in that the fastening system for fastening a device to a hollow component having two holes situated opposite one another has a first screw having a head and a sliding sleeve. The first screw with a head is designed to be guided through at least a first of the two holes. The sliding sleeve is designed to accept the first screw, for example in the second of the two holes, the sliding sleeve being displaceable relative to the hollow component and/or the device to be fastened. In this way, a tolerance compensation can be easily and reliably realized by the sliding sleeve. The sliding sleeve can be used to fasten the first screw, or alternatively also as an intermediate part for a counter-element to the first screw, for example a second screw or a nut or the like.

Preferred developments of the present invention are disclosed herein.

Preferably, the device to be fastened is an electric drive of a bicycle, and the hollow component is a frame or a frame part.

According to an example embodiment of the present invention, the fastening system preferably includes a first screw with a head, designed to be guided through the first of the holes in the hollow component. In addition, the sliding sleeve with an outer diameter that has tolerances is provided, which is designed to accept the first screw at the other hole. Here an outer diameter of the sliding sleeve is selected such that there is a clearance fit with the other hole in which the first screw is not situated. The clearance fit enables a simple and reliable tolerance compensation while maintaining the necessary mechanical stability of the fastening system. In addition, the sliding sleeve enables noise reduction when the device to be fastened produces noises during operation, which is possible for example if the device is an electric drive of a bicycle.

According to an example embodiment of the present invention, preferably, the sliding sleeve has an inner threading for accepting the first screw, and the first screw preferably has an outer threading that can be brought into engagement with the inner threading of the sliding sleeve. In this way, a minimum number of parts and in particular a small space requirement and low weight of the fastening system can be realized.

Further preferably, the fastening system includes in addition a second screw that is preferably connected directly, or alternatively indirectly, to the first screw. Preferably, the first screw has a blind hole having an inner threading that is designed to accept the second screw, which has an outer threading. Alternatively, the second screw has a blind hole having an inner threading that is designed to accept the first screw having a correspondingly formed outer threading. Instead of a blind hole, a through-hole can also be provided.

Particularly preferably, the first screw is realized such that it is longer than the second screw. Here the first screw is particularly preferably fashioned such that the first screw has a length that extends through both the first and the second of the holes in the hollow component.

Further preferably, the sliding sleeve has a main body and an inner flange. Here the main body and the inner flange are made of two different materials. The main body defines the outer diameter of the sliding sleeve, in particular with a clearance fit. The inner flange is made of a harder material than is the main body. The inner flange is preferably made of a metallic material and the main body is preferably made of a plastic material.

Further preferably, the sliding sleeve has an outer flange. The outer flange is preferably made of the same material as the inner flange. Particularly preferably, the inner flange and the outer flange are made as perforated disks or flat washers. Here, the main body is situated between the inner flange and the outer flange. The inner flange preferably has a larger outer diameter than the main body. The outer flange preferably has a smaller diameter than the main body. The outer flange and the inner flange can be fixedly connected to the main body, or alternatively the outer flange and the inner flange are placed only loosely on the main body. When mounting the fastening system, the outer flange and the inner flange are pressed against the end faces of the hollow cylindrical main body, and this body deforms elastically in order to execute the tolerance compensation and the fixing.

Further preferably, the fastening system has a first socket and a second socket, the first screw being guided through the first and second socket.

The first socket preferably has an inner socket and an outer socket, the inner socket and the outer socket being made of different materials. The inner socket is preferably made of a harder material than the outer socket. In the same way, the second socket has an inner socket and an outer socket that are preferably made with different materials. Further preferably, in the second socket the inner socket is an inner threading that is designed to engage with an outer threading of the first screw.

Particularly preferably, the first socket and the second socket each have an outward-oriented flange. The outward-oriented flange is particularly preferably provided both in the inner socket and in the outer socket.

The material of the inner socket of the first and second socket is preferably a hard elastic material, in particular metal. The material of the outer socket of the first and second socket is preferably a soft elastic material, in particular a plastic.

According to a further preferred example embodiment of the present invention, the fastening system in addition includes a first and/or second intermediate element made of a steel wire mesh, each of the intermediate elements having a centric opening. The intermediate elements are preferably fashioned in the manner of sockets, the first screw and/or the second screw being guided through the centric opening of the intermediate elements.

In addition, the present invention relates to a vehicle, in particular an electric bicycle having a fastening system according to the present invention.

BRIEF DESCRIPTION OF THE DRAWINGS

Preferred exemplary embodiments of the present invention are described in detail with reference to the figures.

DETAILED DESCRIPTION OF EXAMPLE EMBODIMENTS

In the following, a fastening system 1 according to a first preferred exemplary embodiment of the present invention is described in detail with reference to FIG. 1.

Fastening system 1 is designed to fasten a device 2, in this exemplary embodiment an electric drive of a bicycle having a multi-part housing 2a, 2b, to a hollow component 3, in this exemplary embodiment a frame component of the bicycle.

Figure 1:
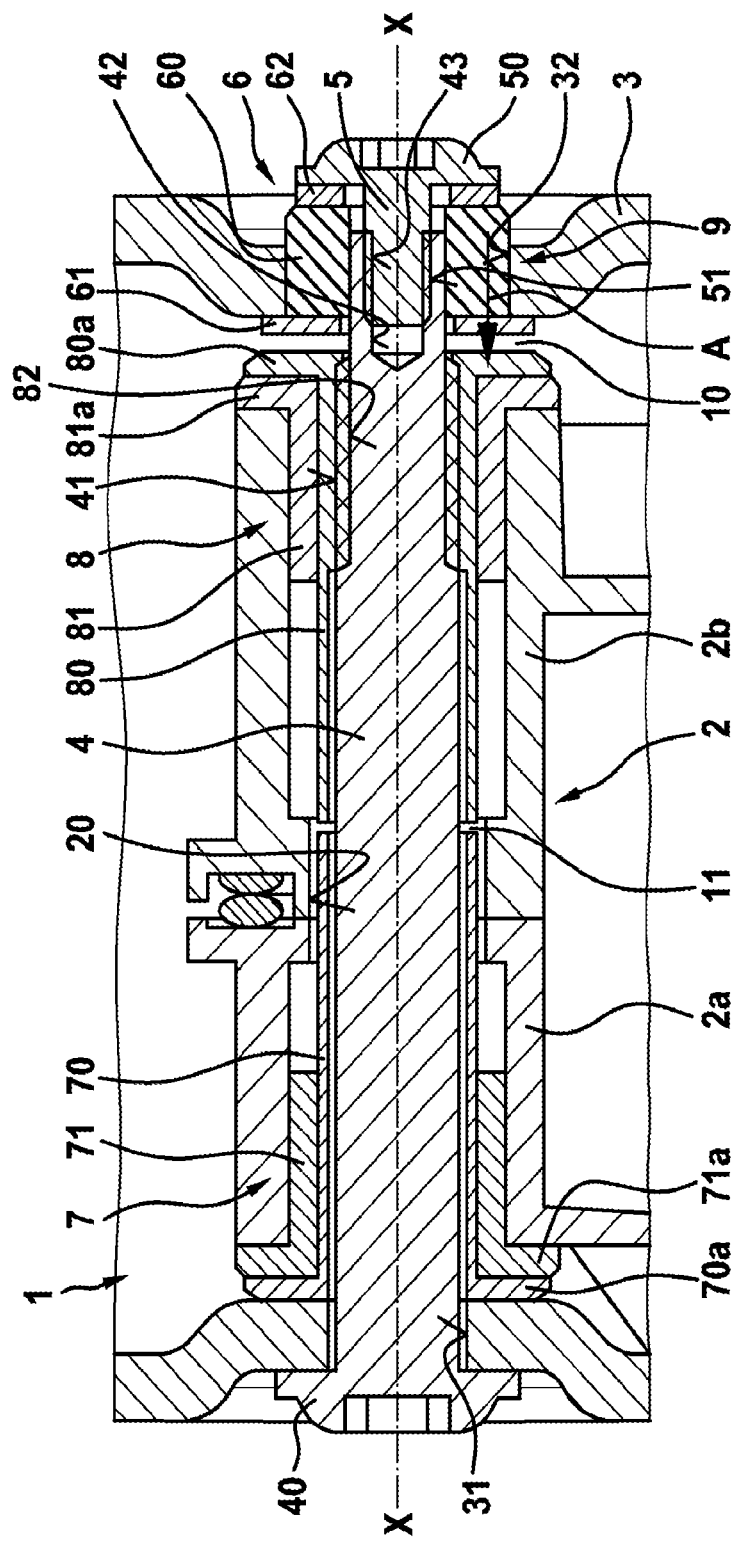
FIG. 1 shows a schematic sectional view of a fastening system of an electric drive on a bicycle frame according to a first exemplary embodiment of the present invention.

As can be seen in FIG. 1, hollow component 3 has a first hole 31 and a second hole 32. The two holes are situated opposite one another on the hollow component. Device 2, which has a through-opening 20, is situated between the two holes. Fastening system 1 is guided through through-opening 20 in device 2. Fastening system 1 includes a first screw 4 with a head 40, and a sliding sleeve 6. Sliding sleeve 6 is designed to accept first screw 4, in particular in second hole 32, sliding sleeve 6 being displaceable relative to hollow component 3 and to device 2.

Fastening system 6 includes a first screw 4 having a head 61 and a sliding sleeve 62. Inner flange 61 preferably has an outer diameter larger than an outer diameter of main body 60. Outer flange 62 has an outer diameter smaller than the outer diameter of main body 60. Sliding sleeve 6 is made of two different materials. Main body 60 is made of a soft flexible material, for example plastic. In particular, main body 60 is elastically deformable. Inner flange 61 and outer flange 62 are made of a hard elastic material, for example metal. In this exemplary embodiment, inner flange 61 and outer flange 62 are provided as perforated discs. Here inner flange 61 and outer flange 62 are each placed only on the end face regions of main body 60.

With its outer diameter, main body 60 defines a clearance fit 9 with second hole 32 of hollow component 3. As a result, a displacement of sliding sleeve 6 in the axial direction X-X of first screw 4 is possible.

Fastening system 1 further includes a second screw 5, as well as a first socket 7 and a second socket 8.

Second screw 5 has a head 50 and a body having an outer threading 51. As can be seen in FIG. 1, the length of second screw 5 in the axial direction X-X is shorter than the length of first screw 4. Here, second screw 5 is significantly shorter than first screw 4. First screw 4 has a length such that it is guided through both first hole 31 and second hole 32. In addition, first screw 4 has a blind hole 42 having an inner threading 43. Second screw 5 is screwed with its outer threading 51 into inner threading 43 of first screw 4. The region of first screw 4 in which blind hole 42 is formed is situated partly inside sliding sleeve 6.

First socket 7 has an inner socket 70 and an outer socket 71. Inner socket 70 and outer socket 71 are made of different materials. Inner socket 70 is preferably made of a metallic material and outer socket 71 is preferably made of a plastic material. The inner socket and the outer socket each have an outward-oriented flange 70a or, respectively, 71a (cf. FIG. 1). The second socket has a design similar to first socket 7, having an inner socket 80 and an outer socket 81. Here inner socket 80 has an outward-oriented flange 80a and outer socket 81 has an outward-oriented flange 81a. In addition, first screw 8 has an inner threading 82 on inner socket 80.

As can be seen in FIG. 1, in addition to inner threading 43 in blind hole 42, first screw 4 also has an outer threading 41. Outer threading 41 engages with inner threading 82 of second socket 8.

FIG. 1 shows a state of fastening system 1 in which fastening system 1 is first in a pre-mounted state. Here there is still a gap 10 between second socket 8 and sliding sleeve 6 (cf. FIG. 1). In the fully mounted state, second screw 5 is screwed completely into blind hole 42 of the first screw 4, sliding sleeve 6 moving in the direction of arrow A, towards second socket 8. As a result, gap 10 is closed. As soon as there is contact between sliding sleeve 6, in the region of inner flange 61, with second socket 8 in the region of flange 80a, an elastic deformation of main body 60 of sliding sleeve 6 begins, until the final fixing. In this way, sliding sleeve 6 can provide a tolerance compensation in a simple and effective manner.

Thus, fastening system 1 enables a two-stage screw connection, and in addition main body 60 of sliding sleeve 6 enables an acoustic damping of the structural mechanical transfer path of the electric drive to the hollow frame. The mounting of fastening system 1 does not introduce any significant tensions into the overall system, and in particular interrupts an acoustic transfer path from device 2 to hollow component 3.

In addition, first socket 7 and second socket 8 form, through their respective inner sockets 70, 80, a stop via which a necessary tensioning of the fastening system is dissipated. FIG. 1 also shows the state in which there is a small second gap 11 between inner sockets 70 and 80. In addition, device 2 is fixed to the side at left in FIG. 1 by the long first screw 4. In this way, the first screw connection between first screw 4 and second socket 8 is provided, and the second screw connection between first screw 4 and second screw 5 is realized. During the process of screwing in second screw 5, sliding sleeve 6 is thus displaced in the axial direction X-X, as a result of the clearance fit 9, until it stops against flange 80a, until the gap 10 is closed. In this way, a tolerance compensation between device 2 and hollow component 3 can be enabled. A further tolerance compensation is enabled through deformation of the two outer sockets 71, 81 and closing of the second gap 11. When second screw 5 is further screwed into first screw 4, main body 60 is elastically deformed as described above, so that main body 60 is widened in second hole 32 in such a way that main body 60 is permanently fixedly clamped in second hole 32. In this way, the second side of fastening system 1 is also fixedly anchored on the frame, and a secure fastening of the electric drive on the frame is enabled.

Figure 2:
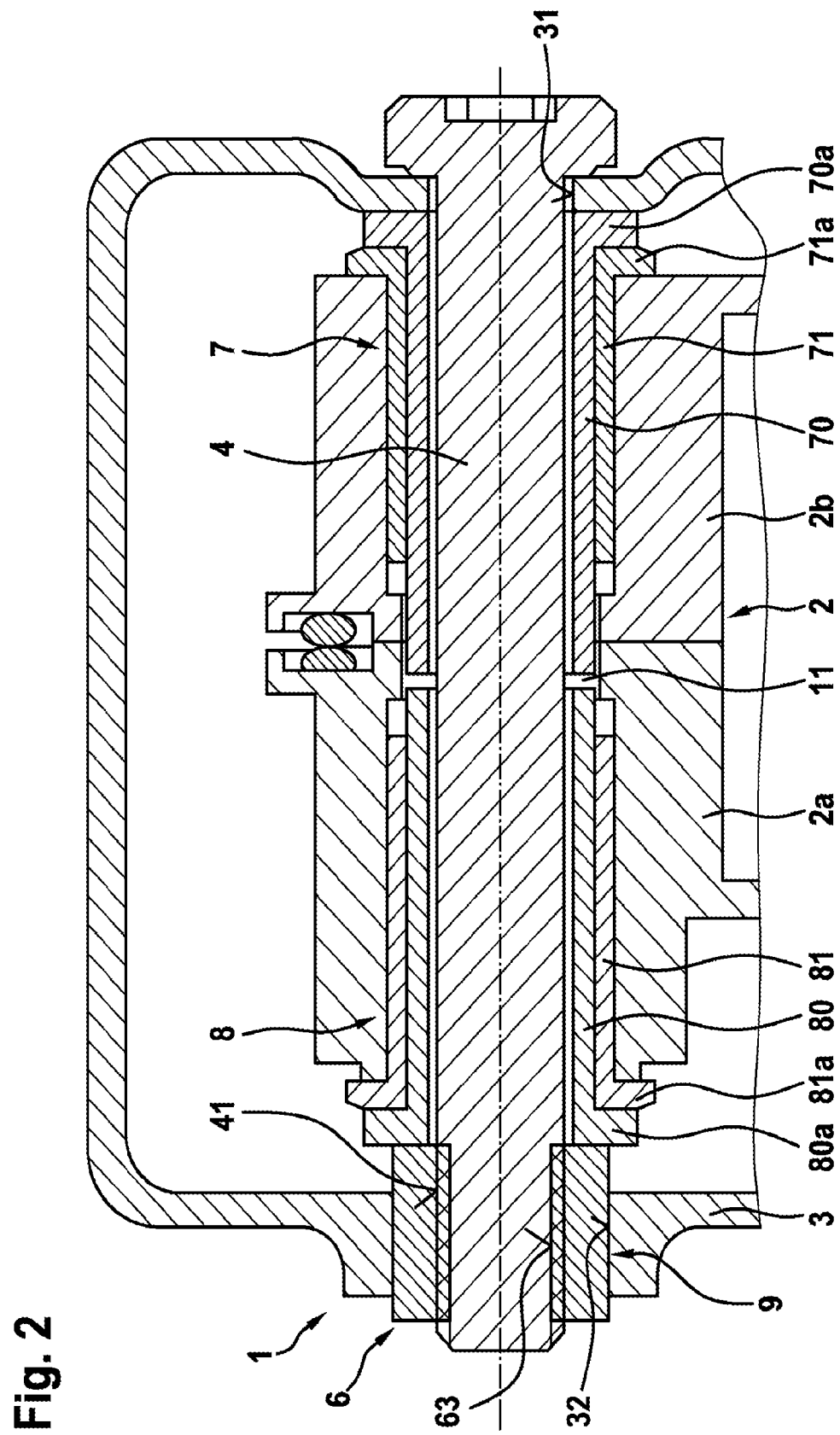
FIG. 2 shows a schematic sectional view of a fastening system of an electric drive on a bicycle frame according to a second exemplary embodiment of the present invention.

FIG. 2 shows a fastening system 1 according to a second exemplary embodiment of the present invention. Identical or functionally identical parts are designated with the same reference characters.

Differing from the first exemplary embodiment, fastening system 1 of the second exemplary embodiment has a sliding sleeve 6 that has an inner threading 63. First screw 4 has an outer threading 41. Outer threading 41 engages with inner threading 63 of sliding sleeve 6. In addition, a first socket 7 and a second socket 8 are provided, second socket 8 having no inner threading in the second exemplary embodiment. First and second socket 7 and 8 each have an inner socket 70, 80 and an outer socket 71, 81. Here, first and second sockets 7, 8 have different axial lengths.

A clearance fit 9 is again formed between sliding sleeve 6 and second hole 32. In this way, a tolerance compensation can be enabled. Alternatively, there can be a transition fit between sliding sleeve 6 and second hole 32. When first screw 4 is tightened, sliding sleeve 6 is thus displaced in the axial direction, towards device 2, until sliding sleeve 6 contacts flange 80a of second socket 8. Starting from the time of contact, a pre-tension force for the fastening of device 2 on hollow component 3 is then built up.

Figure 3:
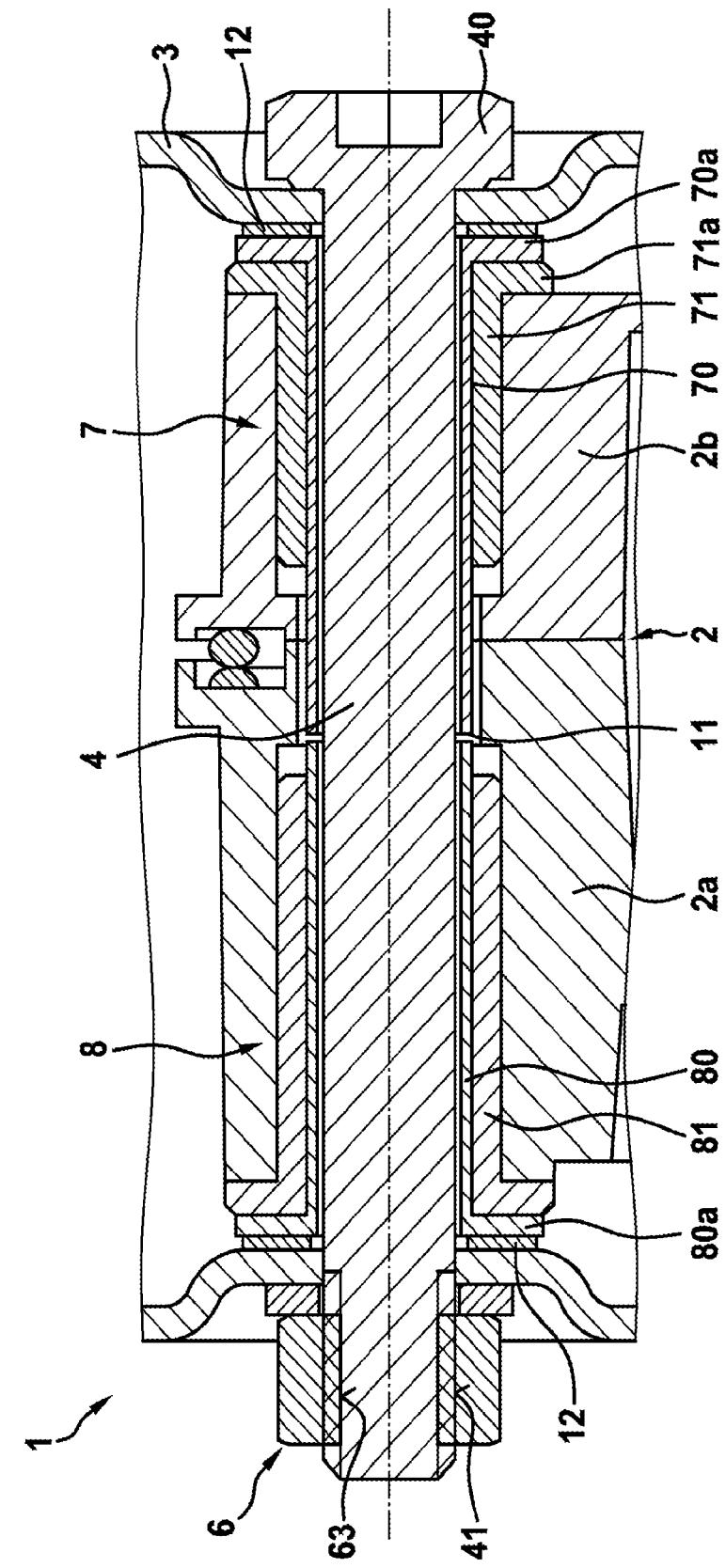
FIG. 3 shows a schematic sectional view of a fastening system of an electric drive on a bicycle frame according to a third exemplary embodiment of the present invention.
Figure 4:
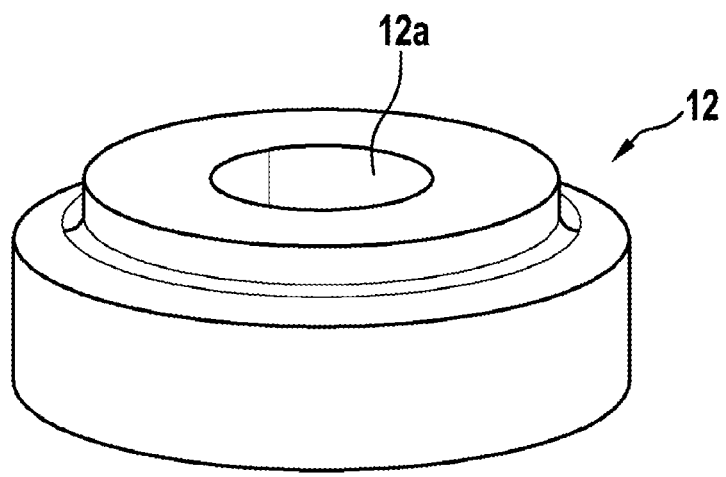
FIG. 4 shows a schematic perspective view of an element made of steel wire mesh from FIG. 3.

FIGS. 3 and 4 show a fastening system 1 according to a third exemplary embodiment of the present invention. Identical or functionally identical parts are designated with the same reference characters as in the above-described exemplary embodiments.

The third exemplary embodiment additionally has damping elements 12 that are situated between device 2 and hollow component 3. More precisely, damping elements 12, as visible in FIG. 2, are disk-type components having a centric opening 12a, situated at the left and at the right on the inner sides of the bicycle frame. Thus, damping elements 12 are situated between first socket 7 and the bicycle frame, or between second socket 8 and the bicycle frame. Damping elements 12 are made of a steel wire mesh. A degree of damping, as well as a stiffness of damping element 12, can be set deliberately via the mesh and a predetermined degree of pressure. Through the use of the meshed damping elements 12, a thermal and also an electrical connection can thus be realized. Damping element 12 is used in particular to dampen vibration, and to reduce noise transmitted from device 2 to hollow component 3. Thus, in particular a decoupling of the bicycle frame from the electric drive of the bicycle is enabled. As metal, preferably CrNi or a corresponding alloy is used. This has the advantage of long lifespan and high loadability. In addition, this material is resistant to aging, so that no creepage and no hardening occur. In other respects, this exemplary embodiment corresponds to the preceding exemplary embodiment, so that reference is made to the description provided there.

Figure 5:
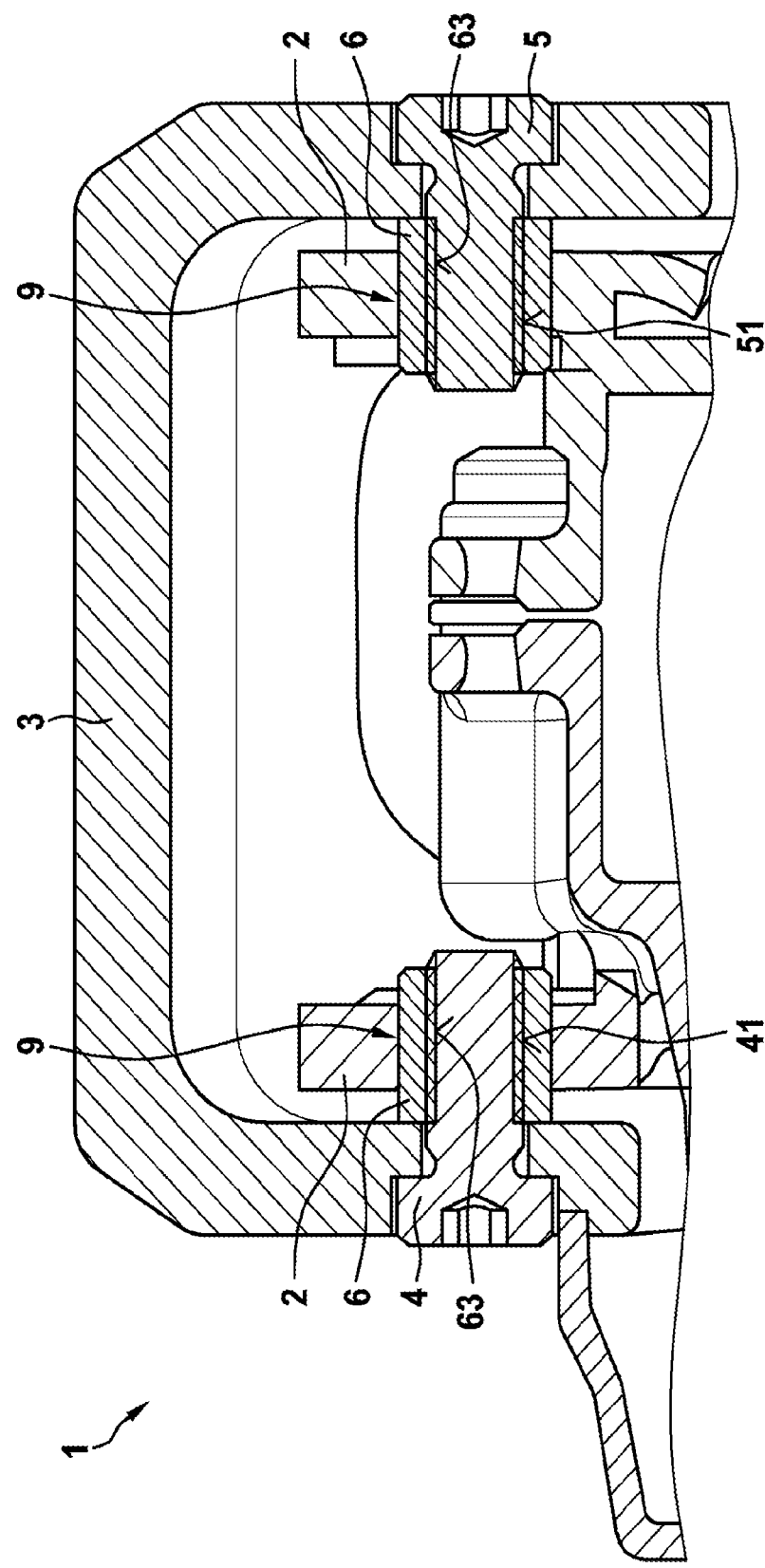
FIG. 5 shows a schematic sectional view of a fastening system of an electric drive on a bicycle frame according to a fourth exemplary embodiment of the present invention.

FIG. 5 shows a fastening system 1 according to a fourth exemplary embodiment of the present invention. Identical or functionally identical parts are again designated with the same reference characters as in the above-described exemplary embodiments.

In the fourth exemplary embodiment, sliding sleeve 6 is no longer situated in hollow component 3, but rather in device 2. As can be seen in FIG. 5, two sliding sleeves 6 are provided here. In addition, each of the sliding sleeves 6 has an inner threading 63. Inner threadings 63 respectively engage with outer threading 41 of first screw 4 or with outer threading 51 of second screw 5. Sliding sleeves 6 can compensate tolerances between hollow component 3 and device 2. Sliding sleeves 6 are each situated in device 2 with a clearance fit 9. Preferably, a lubricant grease is introduced into the receptacle opening of device 2 in order to prevent gap corrosion. In this way, a tolerance compensation can be enabled with a fastening system 1 having a very simple design.

Figure 6:
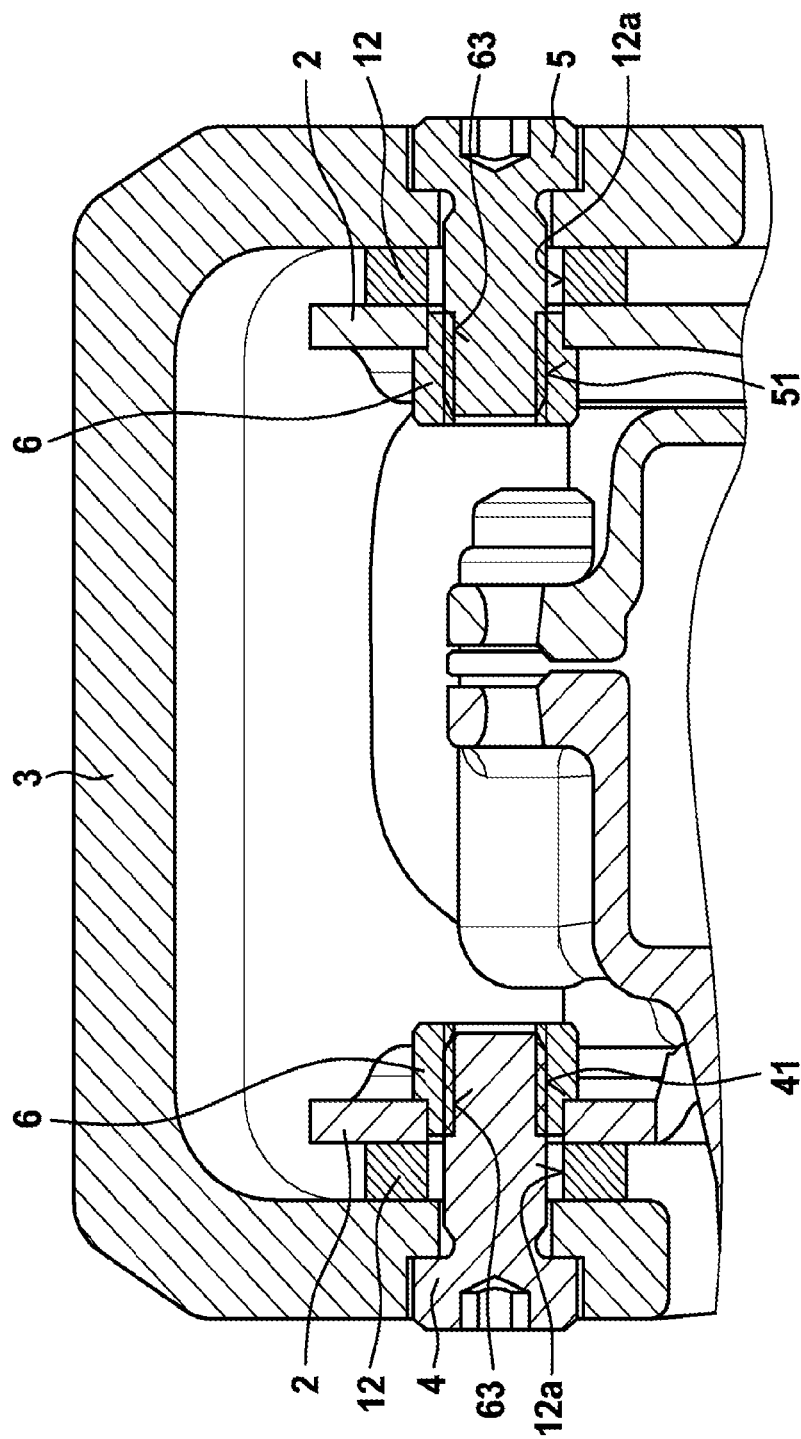
FIG. 6 shows a schematic sectional view of a fastening system of an electric drive on a bicycle frame according to a fifth exemplary embodiment of the present invention.

FIG. 6 shows a fastening system 1 according to a fifth exemplary embodiment of the present invention. Identical or functionally identical parts are designated with the same reference characters as in the above-described exemplary embodiments. Similar to the third exemplary embodiment, the fifth exemplary embodiment has damping elements 12 made of a steel wire mesh, as shown in FIG. 4. Damping elements 12 enable an acoustic decoupling of device 2 from hollow component 3. As in the fourth exemplary embodiment, two sliding sleeves 6 are situated in device 2, in corresponding bores or the like. First screw 4, or, respectively, second screw 5, are each screwed into one of the sliding sleeves 6 in device 2, as in the fourth exemplary embodiment. During the screwing-in process, a tolerance compensation through axial displacement of sliding sleeves 6 can again be enabled. In other respects, this exemplary embodiment corresponds to the preceding exemplary embodiments, so that reference is made to the description provided there.

What is claimed is:

1. A fastening system, configured to fasten a device to a hollow component that has two holes situated opposite one another, the fastening system comprising:
    a first screw that has a head and that is configured to be guided through a first hole of the holes; and
    a sliding sleeve that is configured to accept the first screw, the sliding sleeve being displaceable relative to the hollow component and/or to the device,
    wherein the sliding sleeve has an outer diameter that has a tolerance, the sliding sleeve being configured to accept the first screw at a second hole of the holes, and wherein a clearance fit is formed at the outer diameter of the sliding sleeve, so that the sliding sleeve is displaceable in an axial direction of the first screw, in the second hole.

2. The fastening system as recited in claim 1, wherein the sliding sleeve has an inner threading configured to accept the first screw.

3. The fastening system as recited in claim 1, further comprising:
   a second screw,
   wherein the first screw has a blind hole having an inner threading and the second screw has an outer threading that is configured for a screw connection with the inner threading of the blind hole, or
   the first screw has an outer threading and the second screw has a blind hole with inner threading that is configured to accept the outer threading of the first screw.

4. The fastening system as recited in claim 3, wherein a length of the first screw is greater than a length of the second screw.

5. The fastening system as recited in claim 1, wherein the sliding sleeve has a main body and an inner flange, the main body being made of a different material than the inner flange, and the main body has a lower hardness than the inner flange.

6. The fastening system as recited in claim 5, wherein the sliding sleeve further has an outer flange, the outer flange being made of the same material as the inner flange.

7. The fastening system as recited in claim 6, wherein the outer flange and the inner flange are perforated discs that are fixedly connected to the main body or are loosely placed on the main body.

8. The fastening system as recited in claim 5, wherein the clearance fit is formed at an outer circumference of the main body.

9. The fastening system as recited in claim 1, further including a first socket and a second socket, the first screw being guided through the first socket and the second socket.

10. The fastening system as recited in claim 9, wherein the first socket has an inner socket and an outer socket, and/or the second socket has an inner socket and an outer socket, and wherein the inner socket is made of a different material than the outer socket.

11. The fastening system as recited in claim 10, wherein a hardness of the inner socket is greater than a hardness of the outer socket.

12. The fastening system as recited in claim 10, wherein the second socket has an inner threading and the first screw has an outer threading that is engaged with the inner threading of the second socket.

13. The fastening system as recited in claim 10, wherein the first socket and the second socket each have an outward-oriented flange at one of their ends, the flange being formed in by the inner socket and the outer socket.

14. The fastening system as recited in claim 1, further comprising a damping element made of a steel wire mesh that has a centric opening, at least the first screw being guided through the damping element.

15. The fastening system as recited in claim 1, wherein the sliding sleeve is situated in the second hole.

16. A vehicle, comprising:
   a device;
   a hollow component having two holes situated opposite one another; and
   a fastening system configured to fasten the device to the hollow component, the fastening system including:
      a first screw that has a head and that is configured to be guided through a first hole of the holes, and
      a sliding sleeve that is configured to accept the first screw, the sliding sleeve being displaceable relative to the hollow component and/or to the device,
   wherein the sliding sleeve has an outer diameter that has a tolerance, the sliding sleeve being configured to accept the first screw at a second hole of the holes, and wherein a clearance fit is formed at the outer diameter of the sliding sleeve, so that the sliding sleeve is displaceable in an axial direction of the first screw, in the second hole.

17. The vehicle as recited in claim 16, wherein the vehicle is an electric bicycle, the device is an electric drive of the electric bicycle, and the hollow component is a frame of the electric bicycle or a frame component of the electric bicycle.

\* \* \* \* \*